(12) United States Patent
Ando et al.

(10) Patent No.: US 8,724,295 B2
(45) Date of Patent: May 13, 2014

(54) SOLID ELECTROLYTIC CAPACITOR

(75) Inventors: Susumu Ando, Tokyo (JP); Shigeki Shirase, Tokyo (JP)

(73) Assignee: Nippon Chemi-Con Corporation, Tokyo (JP)

( * ) Notice: Subject to any disclaimer, the term of this patent is extended or adjusted under 35 U.S.C. 154(b) by 65 days.

(21) Appl. No.: 13/388,166

(22) PCT Filed: Aug. 21, 2009

(86) PCT No.: PCT/JP2009/004035
§ 371 (c)(1),
(2), (4) Date: Feb. 29, 2012

(87) PCT Pub. No.: WO2011/021255
PCT Pub. Date: Feb. 24, 2011

(65) Prior Publication Data
US 2012/0154986 A1  Jun. 21, 2012

(51) Int. Cl.
*H01G 9/00* (2006.01)
*H01G 9/04* (2006.01)
*H01G 9/145* (2006.01)

(52) U.S. Cl.
USPC ............................. 361/523; 361/528; 361/532

(58) Field of Classification Search
None
See application file for complete search history.

(56) References Cited

U.S. PATENT DOCUMENTS 7,158,366 B2 * 1/2007 Kobayashi et al. ............ 361/523
7,457,103 B2 * 11/2008 Yoshida et al. ................ 361/523

FOREIGN PATENT DOCUMENTS

| JP | 2003-158042 | 5/2003 |
| JP | 2004-281715 | 10/2004 |
| JP | 2008-135425 | 6/2008 |
| JP | 2007-294012 | 12/2008 |

* cited by examiner

*Primary Examiner* — Eric Thomas
*Assistant Examiner* — Dion Ferguson

(57) ABSTRACT

A positive electrode 21 and negative electrode 22 formed of a thin metal plate are disposed on the same plane with a space provided therebetween. An insulative resin is disposed in the space between the both electrodes. The insulative resin electrically insulates the positive and the negative electrodes, and making both electrodes integrated as a sheet to form a terminal board. Positive- and negative-electrode drawing portions are formed on the same surface of the main body of a capacitor element, and that surface serves as a joined face with the terminal board. With the terminal board being superimposed on the joined face of the capacitor element, the metal plate forming the positive and negative electrodes of the terminal board are electrically coupled to the positive- and negative-electrode drawing portions of the element, respectively.

3 Claims, 8 Drawing Sheets

SOLID ELECTROLYTIC CAPACITOR

TECHNICAL FIELD

The present invention relates to, among capacitors used for various electronic apparatuses, a surface-mount-type solid electrolytic capacitor which has conductive high molecules used as a solid electrolyte, and which is appropriate for a surface-mount application.

RELATED ART

Together with the high frequency operation of electronic apparatuses, capacitors are needed which are one of electronic components and which have better impedance characteristics in a high frequency range than those of conventional capacitors. In order to meet such a need, various solid electrolytic capacitors are examined which use conductive high molecules with a high electrical conductivity as a solid electrolyte.

Recently, solid electrolytic capacitors are disposed near an LSI like a CPU typical of a computer, an image processing LSI for a television, and a memory, etc., exchanging data with such an LSI, and are used for supplying power to those devices.

For such solid electrolytic capacitors, followings are strongly requested.
  (1) Reduction in size while increasing capacity.
  (2) Accomplishment of low ESR (equivalent series resistance) coping with high frequencies.
  (3) Accomplishment of low ESL (equivalent series inductance) with better characteristics of noise elimination and transient response.

To reduce the ESR of a solid electrolytic capacitor, it is necessary to reduce the internal resistance from a dielectric oxide film that is a static capacitance forming portion of the capacitor to a terminal part that is an output of power. Hence, a material that has a low electric resistance is necessary for forming the solid electrolytic capacitor, and electrically conductive high molecules with a high electrical conductivity are widely used as an electrolyte material. In particular, solid electrolytic capacitors having a solid electrolyte, such as pyrrol, thiophene, and the dielectric thereof, are in practical use.

In view of the structure of a solid electrolytic capacitor, it is attempted to shorten a current path in the electrolytic capacitor as short as possible in order to reduce the internal resistance.

Furthermore, the following techniques are known to accomplish the low ESL of a solid electrolytic capacitor.
  (a) Shorten the length of a current path as short as possible.
  (b) Cancel a magnetic field formed by a current path with another magnetic field formed by another current path.
  (c) Divide a current path into n pieces to make the effective ESL to be 1/n.

JP2008-294012 A and JP2008-135425 A disclose solid electrolytic capacitors which accomplish a low ESR and a low ESL thereof.

As explained above, in order to accomplish a low ESL of a solid electrolytic capacitor, it is effective to shorten the length of a current path as short as possible in the structure of the solid electrolytic capacitor. That is, the interface of the dielectric oxide film serves as a static capacitance of the solid electrolytic capacitor, and it is preferable to reduce distances from this interface of the dielectric oxide film to a positive electrode and a negative electrode which are outputs of power. According to the technology disclosed in JP 2008-294012 A, however, since the positive electrode and the negative electrode are disposed with a thick substrate therebetween, reduction of the distance between both electrodes is restricted. Moreover, both electrodes of JP 2008-294012 A are provided so as to penetrate through the substrate, it is necessary to form a through-hole in the substrate to dispose such electrodes, and thus it is difficult to reduce the distance between both electrodes because of the restriction by a drilling work.

Moreover, in order to utilize the technique of cancelling a magnetic field formed by a current path with another magnetic field formed by another current path, it is effective to make the positive electrode and the negative electrode proximate to each other for increasing the cancelling effect by an induced magnetic field. According to the technology disclosed in JP 2008-135425 A, magnetic fluxes produced by current flowing between respective electrodes are cancelled with each other, but since the negative electrode and the positive electrode are disposed on different surfaces of a capacitor element, it is difficult to reduce the distance between both electrodes, and thus the cancelling effect of an induced magnetic field is low.

It is an object of the present invention to provide a solid electrolytic capacitor that can quickly supply power at the time of a transient response by accomplishing a low ESR that is derived from reduction of the internal resistance of the solid electrolytic capacitor and by accomplishing a low ESL derived from the above-explained two ESL reducing factors.

SUMMARY OF INVENTION

A solid electrolytic capacitor of the present invention employs a following structure. That is, a positive electrode formed of a thin metal plate and a negative electrode formed of a thin metal plate are disposed on the same plane with a space provided therebetween. An insulative resin is disposed in the space between the positive electrode and the negative electrode. The insulative resin electrically insulates the positive electrode and the negative electrode and making both electrodes integrated as a sheet, thereby forming a terminal board. A positive-electrode drawing portion and a negative-electrode drawing portion are formed on the same surface of a main body of a capacitor element, and the surface is taken as a joined face with the terminal board. The metal plate forming the positive electrode of the terminal board and the metal plate forming the negative electrode of the terminal board are electrically coupled to the positive-electrode drawing portion of the capacitor element and the negative-electrode drawing portion of the capacitor element, respectively, with the terminal board being superimposed on the joined face of the capacitor element.

According to the solid electrolytic capacitor of the present invention employing the above-explained structure, respective distances from the positive-electrode drawing portion of the capacitor element and the negative-electrode drawing portion thereof to the positive electrode of the terminal board and the negative electrode thereof that are outputs of a current can be accomplished by a distance by what corresponds to the thickness of the terminal board only, thereby shortening the length of the current path. According to the present invention, moreover, it is enough that the terminal board has a space merely for insulating the positive electrode and the negative electrode from each other. Accordingly, it is possible to make both electrodes proximate to each other, and to set the dimension of the space appropriately depending on a desired electrical characteristic. Since both electrodes are made proximate to each other, a cancelling effect of an induced magnetic field due to the proximity of the positive electrode and the negative electrode is large in, in particular, a high-frequency range, thereby reducing the ESL of the solid electrolytic capacitor.

DETAILED DESCRIPTION OF THE EMBODIMENTS

Embodiments

1. First Embodiment

1.1 Configuration (1) Structure of Capacitor Element 10

Figure 1A:
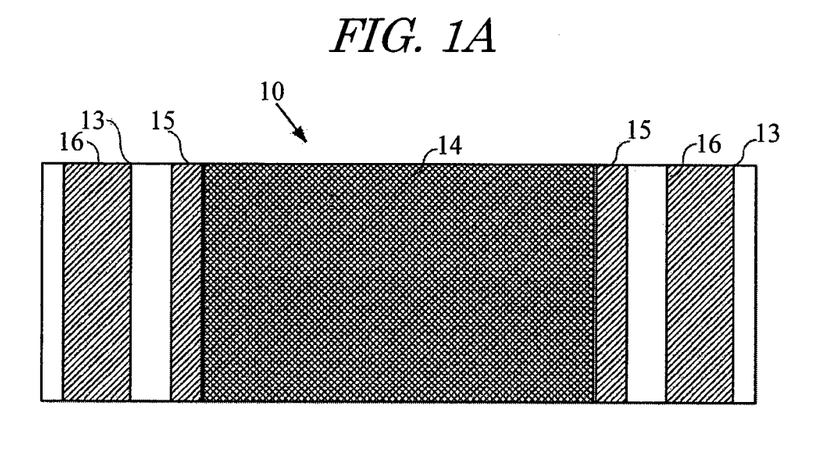
FIGS. 1A to 1C are cross-sectional view and plan views showing a structure of a capacitor element according to a first embodiment.
Figure 1B:
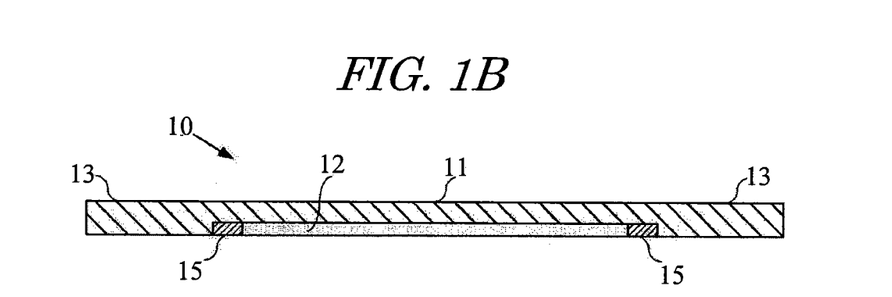

As shown in FIG. 1A, a capacitor element 10 of a first embodiment is formed of a valve-metal plate or a valve-metal foil (hereinafter, referred to as a positive-electrode body 11) like substantially rectangular aluminum with a thickness of 100 to 500 μm or so. The positive-electrode body 11 has a center part enlarged by etching process, and has a porous etched layer 12 formed on one surface of the positive-electrode body 11 (see FIG. 1B).

Figure 1C:
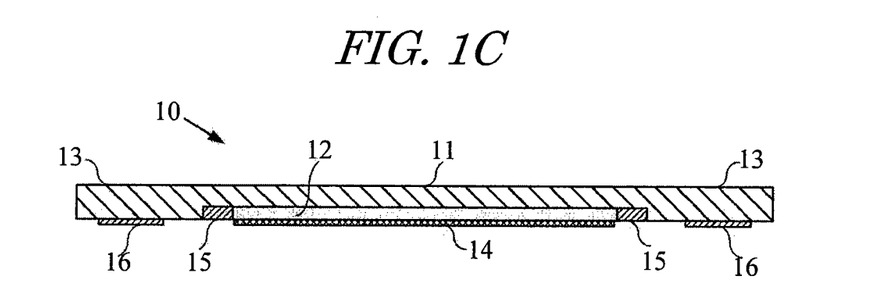

Non-etched portions at both ends of the positive-electrode body 11 are to form positive-electrode drawing portions 13 of the capacitor element 10. Formed on the etched layer 12 successively are a dielectric oxide film to be a dielectric layer, and a negative-electrode drawing layer 14 formed of a solid electrolyte layer, a graphite layer and a silver paste layer (see FIG. 1C).

In this case, the solid electrolyte layer formed on the dielectric oxide film is formed by soaking the positive-electrode body 11 in a polymerizable monomer solution and an oxidizer solution, successively, and picking up such a positive-electrode body from each solution in order to proceed a polymerization reaction. Formation of the solid electrolyte layer may be carried out by a technique of coating or discharging the polymerizable monomer solution and the oxidizer solution. Moreover, a technique may be adopted which soaks or coats the positive-electrode body 11 in or with a mixture solution of the polymerizable monomer solution and the oxidizer solution. A technique by electropolymerization applied in the field of solid electrolytic capacitor, and an coating and drying of a conductive high molecule solution may be adopted to form the solid electrolyte layer. Furthermore, those formation techniques of the solid electrolyte may be combined to form the solid electrolyte layer. Appropriate examples of the polymerizable monomer used for the formation of the solid electrolyte layer are thiophene, pyrrol, or the dielectric thereof.

The capacitor element 10 is formed with a separator layer 15 that divides the positive-electrode drawing portion 13 of the capacitor element 10 and the negative-electrode drawing portion 14 thereof. The separator layer 15 is formed by applying an insulative resin after the etching process completes and letting such a resin permeate to the etched layer 12, thereby electrically insulating the positive-electrode drawing portion 13 from the etched layer 12.

Moreover, it is preferable that the positive-electrode drawing portion 13 of the capacitor element 10 and the negative-electrode drawing portion 14 thereof should be flat to form the same plane when such a capacitor element is mounted on a terminal board to be discussed later. Accordingly, in order to adjust the height of the positive-electrode drawing portion 13 and that of the negative-electrode drawing portion 14, a metal piece 16 like aluminum can be joined to the surface of the positive-electrode drawing portion 13.

In order to adjust respective heights of the positive-electrode drawing portion 13 and the negative-electrode drawing portion 14, a recess may be formed in the positive-electrode body 11 that is a start material, and an etched layer, a dielectric oxide film, a solid electrolyte layer, a graphite layer, and a silver paste layer may be formed in the interior of the recess, and thus respective heights may be adjusted.

(2) Structure of Terminal Board 20

Figure 2A:
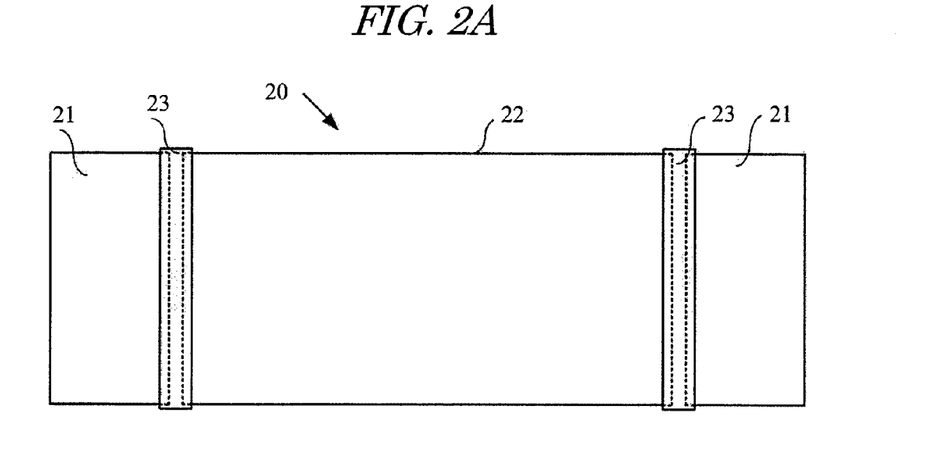
FIGS. 2A and 2B are a plan view and a cross-sectional view showing a structure of a terminal board according to the first embodiment.

As shown in a plan view of FIG. 2A, a terminal board 20 according to the first embodiment is formed of, as an example, a thin copper plate (a copper foil or a copper alloy foil), has mount lands substantially consistent with the positive-electrode drawing portion 13 of the capacitor element 10 and the negative-electrode drawing portion 14 thereof, respectively, and a metal plate forming a positive electrode 21 and a metal plate forming a negative electrode 22 are electrically insulated by insulative resins 23.

Figure 2B:
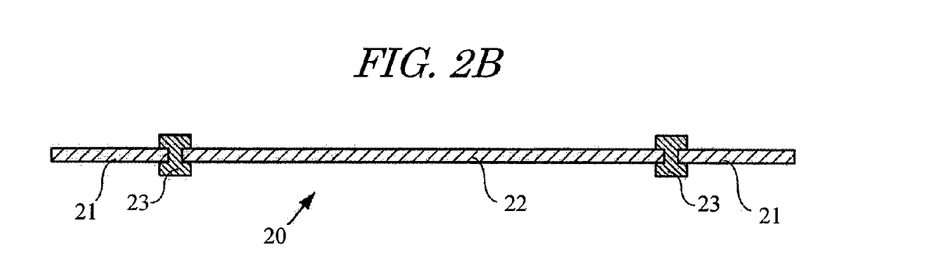

As shown in the cross-sectional view of FIG. 2B, regarding the internal structure of the terminal board 20, the front and rear of the metal plate formed of apiece of copperplate are electrically conducted, the insulative resin 23 is inserted in a space between the positive electrode 21 and the negative electrode 22 in order to accomplish an electrical insulation, and respective portions of the surfaces of the copper plates are covered so as to be continuous with the resin in the space, thereby accomplishing an integration.

That is, the positive electrode 21 formed of a thin metal plate and the negative electrode 22 also formed of a thin metal plate are disposed on the same plane with a space maintained at a predetermined width, the insulative resin 23 is allocated at the space between both electrodes, and thus the insulative resin 23 electrically insulates the positive electrode 21 and the negative electrode 22 from each other and integrates both electrodes as a sheet.

It is preferable to use a rolled copper foil with a thickness of 15 μm to 100 μm as a metal plate forming the terminal board 20. Moreover, it is desirable that the insulative resin 23 should have a thickness such that both faces protrude from the metal plate forming the terminal board at a predetermined height for surely integrating the positive electrode 21 and the negative electrode 22. However, such an insulative resin may have the same thickness as that of the metal plate or may have a zygal cross section so that a joined portion with the metal plate is thicker than the metal plate and the center is thin. A polyester resin or a polyimide resin is used as the material of the insulative resin 23, but the present invention is not always limited to such materials. Other resins can be used as far as the insulating property, the characteristic of close contact with the metal plate, the strength, etc., match the solid electrolytic capacitor to be used.

Next, an explanation will be given of an illustrative manufacturing method of the terminal board 20 having the above-explained structure.

(a) A copper plate to be the positive electrode of the terminal board and a copper plate to be the negative electrode thereof are disposed at respective predetermined positions in a separated manner.

(b) An insulative resin is applied to predetermined locations including a space between the copper plate to be the positive electrode of the terminal board and the copper plate to be the negative electrode thereof, and is heated and cured. This method accomplishes the insulation between the positive electrode and the negative electrode, while at the same time, integration of the separated positive electrode and negative electrode, thereby obtaining the terminal board. In this case, regarding the locations where the insulative resin is applied, it is appropriate if the insulative resin is applied to the space between the positive electrode 21 of the copper plate and the negative electrode 22, and the periphery of such a space, and is applied so that the insulative resin has a thickness protruding from both faces of the copper plates at a predetermined height. The shape of parts (mount lands) exposing the copper plate matches the positive-electrode drawing portion 13 and the negative-electrode drawing portion 14 of the capacitor element 10.

When the positive electrode 21 of the terminal board 20 and the negative electrode 22 thereof are disposed at respective predetermined locations, the width of the space therebetween can be set arbitrary depending on a desired characteristic. More specifically, it is possible to manufacture the terminal board 20 with the width of such a space being up to 20 µm or so.

(3) Mounting of Capacitor Element on Terminal Board

Figure 3:
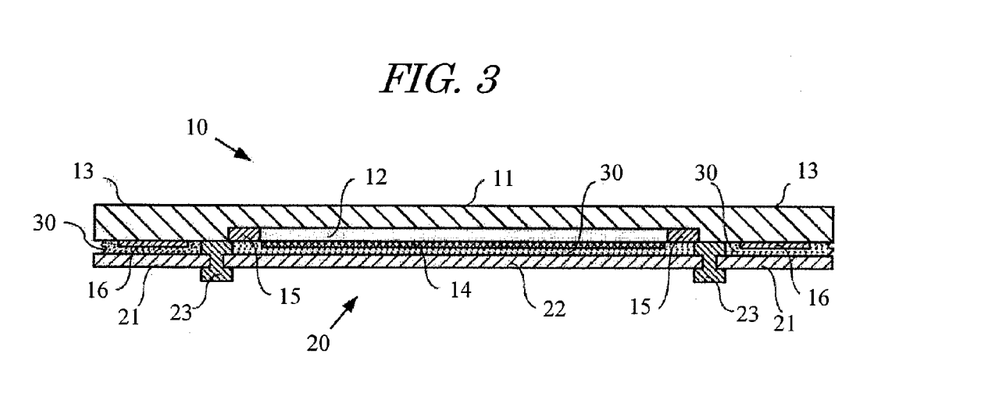
FIG. 3 is a cross-sectional view showing a condition in which the capacitor element is mounted on the terminal board according to the first embodiment.

As shown in FIG. 3, the solid electrolytic capacitor of the first embodiment is configured by mounting the capacitor element 10 on the terminal board 20. In order to mount the capacitor element 10 on the terminal board 20, it is appropriate to bond such a capacitor element by a conductive adhesive 30 like a sliver paste. This silver paste is applied to the capacitor element 10 or the terminal board 20 for bonding, but at this time, the silver paste may flow and the positive electrode and the negative electrode may be short-circuited. According to the first embodiment, however, since the terminal board 20 is formed with the insulative resin layer having a thickness such that both ends of the insulative resin layer protrude from the copper plate at a predetermined height, the protrusions of the insulative resin layer hold back the flow of the silver paste, thereby suppressing a short-circuiting of the positive electrode 21 and the negative electrode 22. The protrusion of the insulative resin 23 can have an arbitrary height, but the higher the height of the protrusion is, the more the effect of holding back the silver paste when the capacitor element 10 is mounted becomes.

Moreover, according to the first embodiment, the space between the positive electrode 21 and the negative electrode 22 is electrically insulated by the insulative resin 23, and such an insulative resin 23 is formed around the space, thereby increasing the joining strength of the positive electrode 21 and the negative electrode 22. This results in improvement of the mechanical strength of the terminal board 20 and increase of the distance between the positive electrode 21 and the negative electrode 22 in a plane where the capacitor element 10 is mounted. Accordingly, when the capacitor element 10 is mounted on the terminal board 20 and joined by the conductive adhesive 30, insulation between the positive electrode 21 and the negative electrode 22 is further ensured.

1.2 Working and Advantage

According to the first embodiment employing the above-explained structure, respective distances from the positive-electrode drawing portion 13 of the capacitor element 10 and the negative-electrode drawing portion 14 thereof to the positive electrode 21 of the terminal board 20 and the negative electrode 22 thereof that are outputs of a current can be accomplished with a distance corresponding to only the thickness of the terminal board 20, and thus a current path can be shortened.

In particular, with respect to the thickness of the terminal board 20, since a copper plate of 15 µm or so is used, a distance from the negative-electrode drawing portion 14 of the capacitor element 10 to the negative electrode 22 of the terminal board 20 can be remarkably reduced in comparison with a case in which the capacitor element 10 is attached to a lead frame and is subjected to resin molding. Moreover, the terminal board 20 is a piece of copper plate with the front face and the rear face being electrically continuous. Accordingly, it has a large number of electrical conduction paths in comparison with a flexible substrate having the front face and the rear face electrically communicated with each other via a through-hole. Hence, the electrical resistance between the front face of the terminal board 20 and the rear face thereof is small, thereby reducing the internal resistance of the solid electrolytic capacitor.

Figure 4:
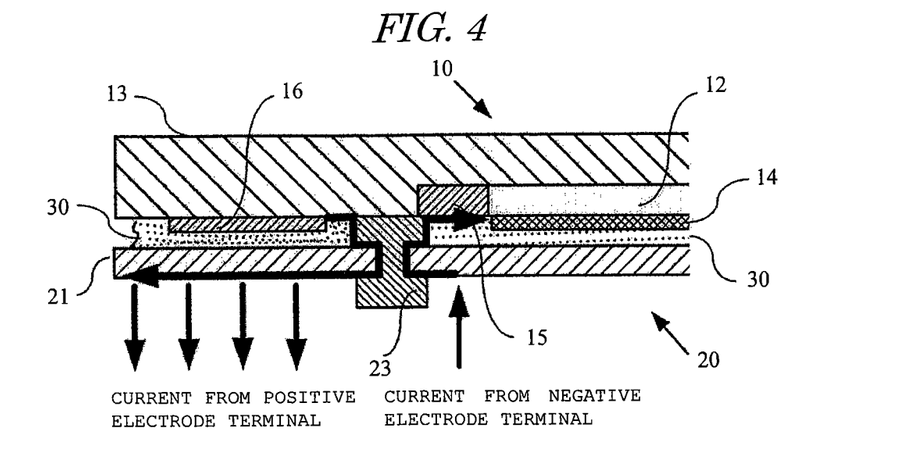
FIG. 4 is an enlarged cross-sectional view showing a current path according to the first embodiment.

Moreover, when the solid electrolytic capacitor is used in a high-frequency circuit, as is shown in the enlarged cross-sectional view of FIG. 4, because of a skin effect, the high-frequency component of current flows through the periphery of the negative electrode 22 and the positive electrode 21 of the terminal board 20. The terminal board 20 of the present embodiment employs a structure that the positive electrode 21 and the negative electrode 22 are proximate to each other with a predetermined clearance, and in particular, in a high-frequency range, a cancelling effect of an induced magnetic field due to the proximity of the positive electrode 21 and the negative electrode 22 is large, thereby reducing the ESL of the solid electrolytic capacitor. A width of the space between the positive electrode 21 of the terminal board 20 and the negative electrode 22 thereof can be set arbitrary depending on a desired characteristic, but it is appropriate to set such a width within a range from 20 to 200 µm in order to obtain the effect of reducing the ESL of the solid electrolytic capacitor.

According to the present embodiment, the insulative resin 23 formed around the space between the positive electrode 21 and the negative electrode 22 increases the joining strength of the positive electrode 21 and the negative electrode 22, thereby increasing the mechanical strength of the terminal board 20. The insulative resin 23 disposed at a space in the terminal board 20 makes the positive electrode 21 and the negative electrode 22 distant from each other on a plane where the capacitor element 10 is mounted. Accordingly, when the capacitor element 10 is mounted on the terminal board 20 and is joined by the conductive adhesive 30, insulation between the positive electrode 21 and the negative electrode 22 is further ensured.

The positive electrode 21 and the negative electrode 22 have a distant shape, but a high-frequency current flows through the periphery of the negative electrode 22 and the positive electrode 21 of the terminal board 20 because of a skin effect when the high-frequency current flows through the conductor, and thus current paths of respective electrodes are proximate to each other. Hence, according to the present embodiment, the effect of reducing the ESL does not decrease.

2. Second Embodiment

Figure 5:
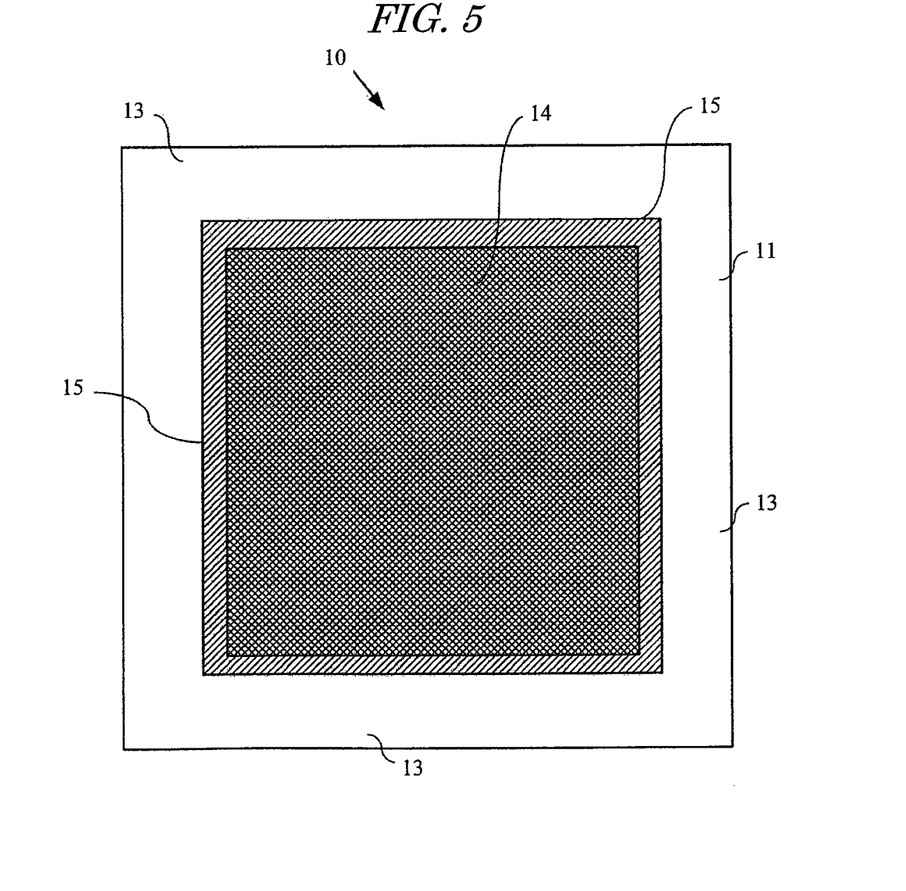
FIG. 5 is a plan view showing a structure of a capacitor element according to a second embodiment.

As shown in FIG. 5, according to a second embodiment, a square positive-electrode body 11 has a center part enlarged by etching process except the four sides, and a porous etched layer is formed on a surface of the positive-electrode body 11. Non-etched portions at both ends of the positive-electrode body 11 are formed in a rectangular ring-like shape in a planar view, and serve as a positive-electrode drawing portion 13 of a capacitor element 10. Formed on the part of the etched layer is a dielectric oxide film to be a dielectric layer by the same technique as that of the first embodiment, and a negative-electrode drawing portion 14 including a solid electrolyte layer, a graphite layer, and a silver paste layer is successively formed.

In order to make the positive-electrode drawing portion 13 of the capacitor element 10 and the negative-electrode drawing portion 14 thereof flat to each other to form the same plane when such a capacitor element is mounted on a terminal board 20, likewise the first embodiment, a metal piece 15 like aluminum can be joined to the positive-electrode drawing portion 13.

Figure 6A:
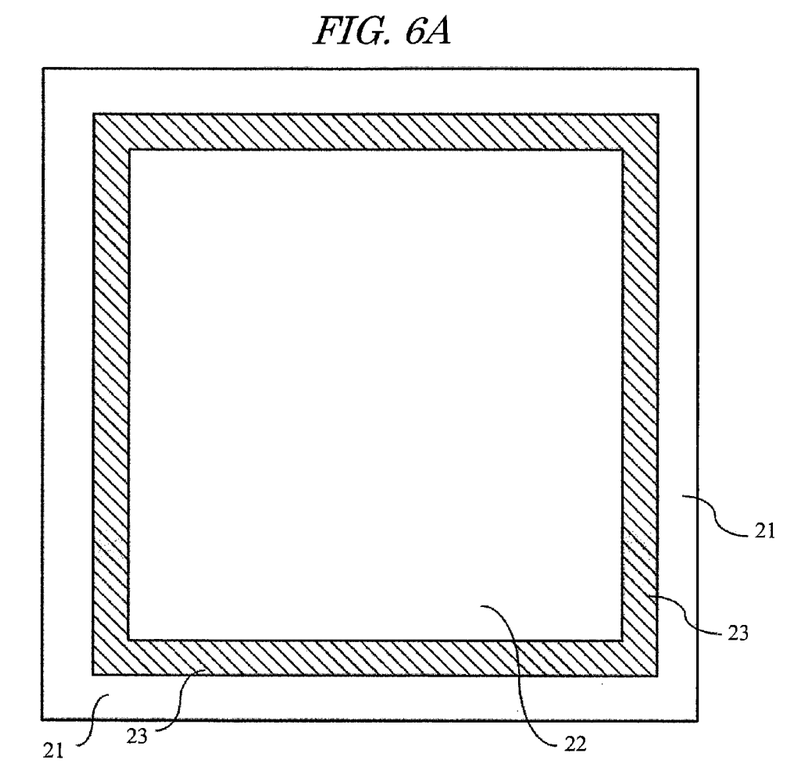
FIGS. 6A and 6B are a plan view and a cross-sectional view showing a structure of a terminal board according to the second embodiment.
Figure 6B:
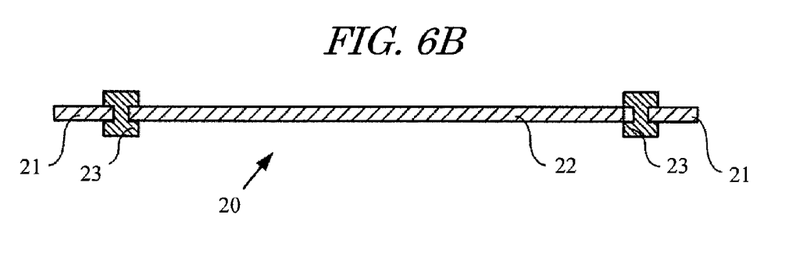

The terminal board 20 of the second embodiment employs a structure shown in FIG. 6. That is, a copper plate in a rectangular ring-like shape which is substantially same as that of the positive-electrode drawing portion 13 of the capacitor element 10 is disposed around a square copper plate in the substantially same dimension as that of the negative-electrode drawing portion 14 of the capacitor element 10 shown in FIG. 5 with a predetermined space being maintained. Between the two copper plates, the internal copper plate is the negative electrode 22 of the terminal board 20, and the external copper plate is the positive electrode 21. The two copper plates are integrated together by an insulative resin 23 provided so as to fill a space therebetween, thereby obtaining the terminal board 20 of the second embodiment. When the capacitor element 10 is mounted on the terminal board 20, like the first embodiment, both members are bonded together by a conductive adhesive 30 like a silver paste.

According to the second embodiment employing the above-explained structure, also the sheet-like terminal board 20 can be attached to a surface of the capacitor element 10, and thus the same advantage as that of the first embodiment can be expected.

3. Third Embodiment

Figure 7A:
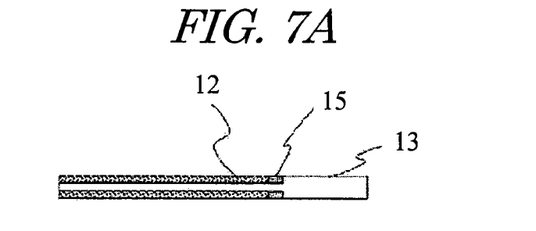
FIGS. 7A to 7C are cross-sectional views showing a structure of a capacitor element piece according to a third embodiment.
Figure 7B:
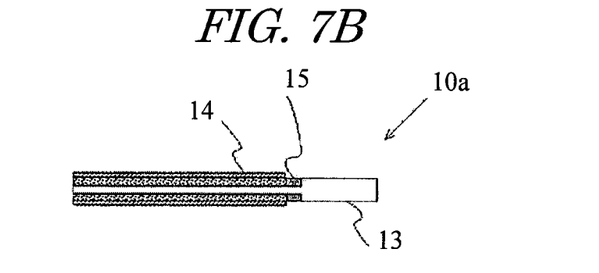
Figure 7C:
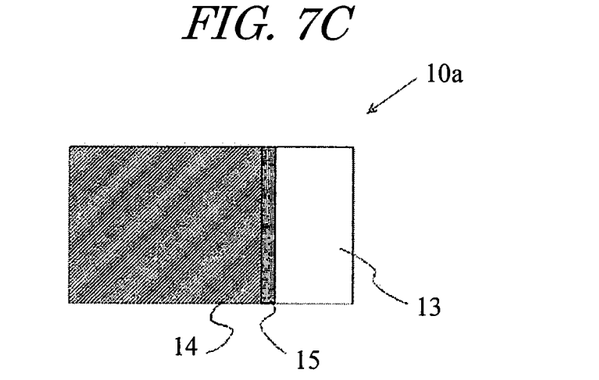

FIGS. 7A to 7C show a capacitor element piece 10a configuring a capacitor element 10 used in a third embodiment of the present invention. The capacitor element piece 10a has etched layers 12 formed on both surfaces of the capacitor element 10 used in the first embodiment, dielectric oxide films to be dielectric layers, respectively, are formed on both etched layers 12, and negative-electrode drawing portions 14 each including a solid electrolyte layer, a graphite layer, and a silver paste layer, are successively formed on respective dielectric layers.

Figure 8A:
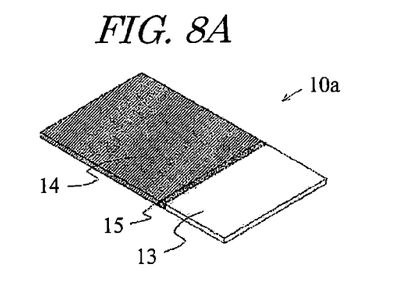
FIGS. 8A and 8B are perspective views showing a structure of a capacitor element according to the third embodiment.
Figure 8B:
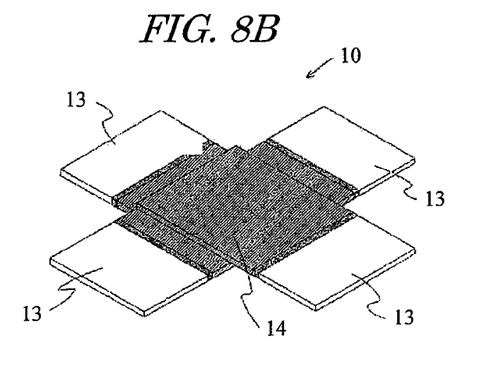

The capacitor element 10 of the third embodiment has the rectangular capacitor element pieces 10a each having one end as a positive-electrode drawing portion 14 and another end as a negative-electrode drawing portion 13 as shown in FIGS. 7A-C and 8A, and is stacked together so that the direction of the positive-electrode drawing portion 14 is oriented to the direction of a rotation angle that is a right angle. According to the capacitor element 10, as shown in FIG. 8B, the center part serves as the negative-electrode drawing portion 14, and the positive-electrode drawing portions 13 are formed in four directions from the negative-electrode drawing portion 14.

Figure 9A:
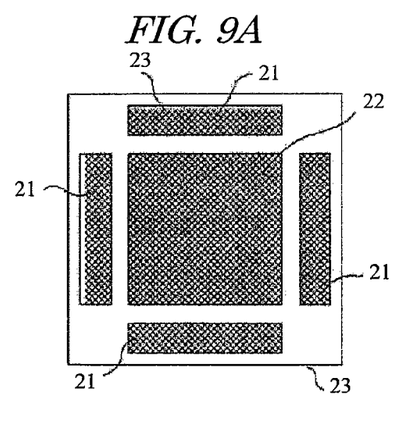
FIGS. 9A and 9B are a plan view and a cross-sectional view showing a structure of a terminal board according to the third embodiment.
Figure 9B:
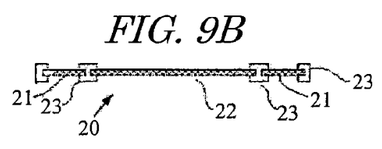

As shown in FIG. 9, a terminal board 20 where the capacitor element 10 of the third embodiment is mounted has a negative electrode 22 formed by a rectangular copper plate located at the center, and four oblong copper plates are disposed therearound which form positive electrodes 21. When the capacitor element 10 shown in FIG. 7 is mounted on the terminal board 20, like the first embodiment, both members are bonded together by a conductive adhesive 30 like a silver paste.

According to the third embodiment employing the above-explained structure, also the sheet-like terminal board 20 can be attached to a surface of the capacitor element 10, and thus the same advantage as that of the first embodiment can be expected.

4. Fourth Embodiment

Figure 10A:
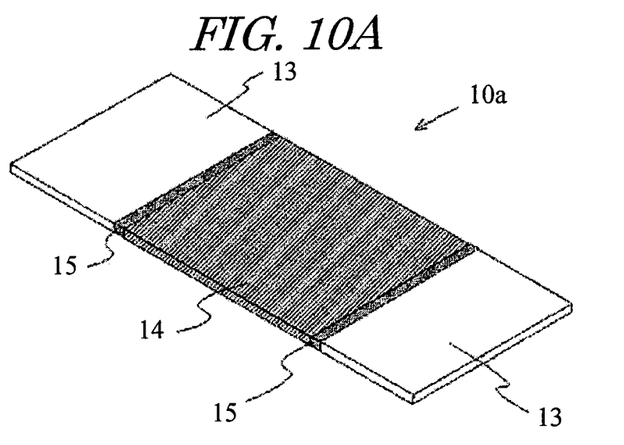
FIGS. 10A and 10B are perspective views showing a structure of a capacitor element according to a fourth embodiment.
Figure 10B:
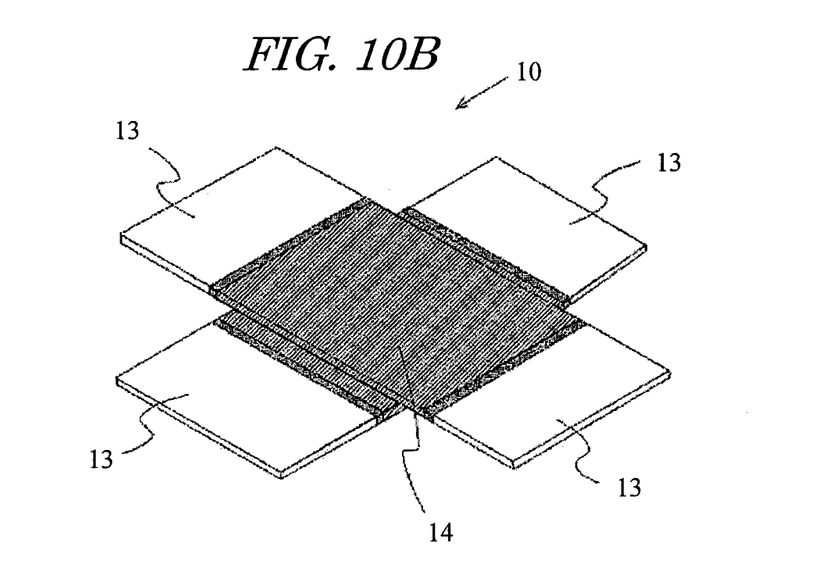

FIGS. 10A and 10B show a capacitor element 10 used in a fourth embodiment. This capacitor element 10 has four positive-electrode drawing portions 13 around a negative-electrode drawing portion 14 in a cross shape. The capacitor element 10 has rectangular capacitor element pieces 10a having both ends as positive-electrode drawing portions 14 and a center part as a negative-electrode drawing portion 13 as shown in FIG. 10A and is stacked together so that the direction of the positive-electrode drawing portion 14 is oriented to the direction of a rotation angle that is 180 degrees. In this case, like the third embodiment, the negative-electrode drawing portions 14 are formed on both surfaces of the capacitor element piece 10a. As shown in FIG. 10B, the capacitor element 10 has the center part serving as the negative-electrode drawing portion 14 and the positive-electrode drawing portions 13 are formed in four directions from the negative-electrode drawing portion 14.

The terminal board 20 shown in FIG. 9 can be used to mount the capacitor element 10 of the fourth embodiment. Moreover, when the capacitor element 10 of the fourth embodiment is mounted on the terminal board 20 of FIG. 9, like the first embodiment, both members are bonded together by a conductive adhesive 30 like a silver paste.

According to the fourth embodiment employing the above-explained structure, also the sheet-like terminal board 20 can be attached to a surface of the capacitor element 10, and thus the same advantage as that of the first embodiment can be expected.

5. Fifth Embodiment

Figure 11A:
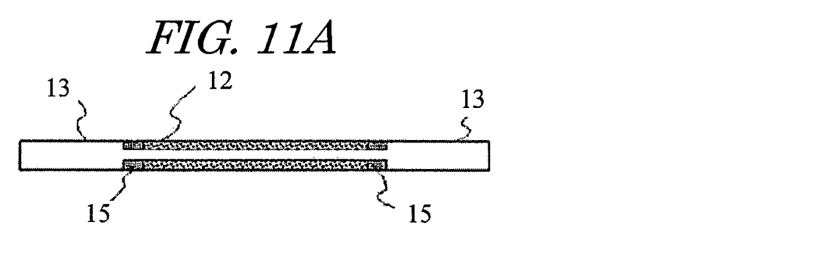
FIGS. 11A to 11C are perspective views showing a structure of a capacitor element according to a fifth embodiment.
Figure 11B:
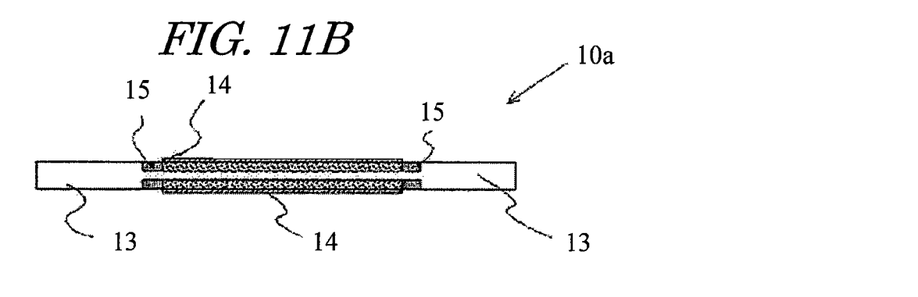
Figure 11C:
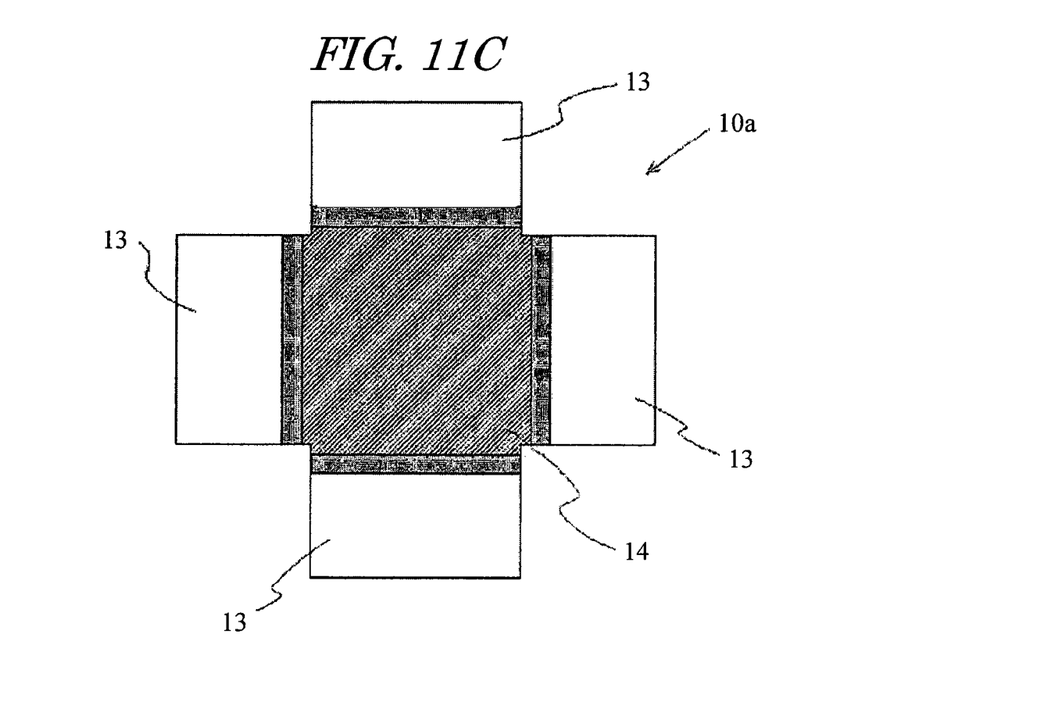

FIGS. 11A and 11B show a structure of a capacitor element piece 10a according to a fifth embodiment of the present invention. The capacitor element piece 10a has a metal foil or a metal plate formed of aluminum, etc., and formed in a cross shape in advance in order to form a positive-electrode body 11, has both ends protruding in four directions as positive-electrode drawing portions 32, and has the center part as a negative-electrode drawing portion 33. In this case, like the capacitor element piece 10*a* shown in FIGS. 7A to 7C, etched layers 12 are formed on both surfaces of the positive-electrode body 11, dielectric oxide films to be dielectric layers, respectively, are formed on both etched layers 12, and negative-electrode drawing portions 14 each including a solid electrolyte layer, a graphite layer, and a silver paste layer are further successively formed on respective dielectric layers.

The capacitor element 10 of the fifth embodiment is formed by stacking the above-explained capacitor pieces 10*a*. Moreover, the terminal board 20 shown in FIG. 9 is used to mount the capacitor element 10 of the fifth embodiment. When the capacitor element 10 of the fifth embodiment is mounted on the terminal board 20, like the first embodiment, both members are bonded together by a conductive adhesive 30 like a silver paste.

According to the fifth embodiment employing the above-explained structure, also the sheet-like terminal board 20 can be attached to a surface of the capacitor element 10, and thus the same advantage as that of the first embodiment can be expected.

The invention claimed is:

1. A solid electrolytic capacitor comprising:
a terminal board including a positive electrode formed of a thin metal plate, a negative electrode formed of a thin metal plate, the positive electrode and the negative electrode being disposed on a same plane with a space provided therebetween, and an insulative resin disposed in the space between the positive electrode and the negative electrode, the insulative resin electrically insulating the positive electrode and the negative electrode and making both electrodes integrated as a sheet;
a positive-electrode body and a porous etched layer at least partially disposed on a same surface of a capacitor element;
a positive-electrode drawing portion having a plate-shape and formed on the surface of the positive-electrode body; and
a negative-electrode drawing portion having a plate-shape and formed on the etched layer with a solid electrolyte layer therebetween, surfaces of the positive-electrode drawing portion serving as a joined face with the terminal board,
the metal plate forming the positive electrode of the terminal board being electrically connected to the positive-electrode drawing portion of the capacitor element and the metal plate forming the negative electrode of the terminal board being electrically connected to the negative-electrode drawing portion of the capacitor element, respectively, with the terminal board being superimposed on the joined face of the capacitor element, and the insulative resin being in contact with the joined face of the capacitor element thereby ensuring insulation between the positive electrode and the negative electrode.

2. The solid electrolytic capacitor according to claim 1, wherein the joined face of the capacitor element is bonded to the metal plate forming the positive electrode of the terminal board by a conductive adhesive and the insulative resin protrudes from a surface of the metal plate, and protrusions of the insulative resin layer hold back the flow of the conductive adhesive at sides of the positive electrode and the negative electrode.

3. The solid electrolytic capacitor according to claim 2, wherein the insulative resin is formed around the space between the positive electrode and the negative electrode.

* * * * *